UNITED STATES PATENT OFFICE.

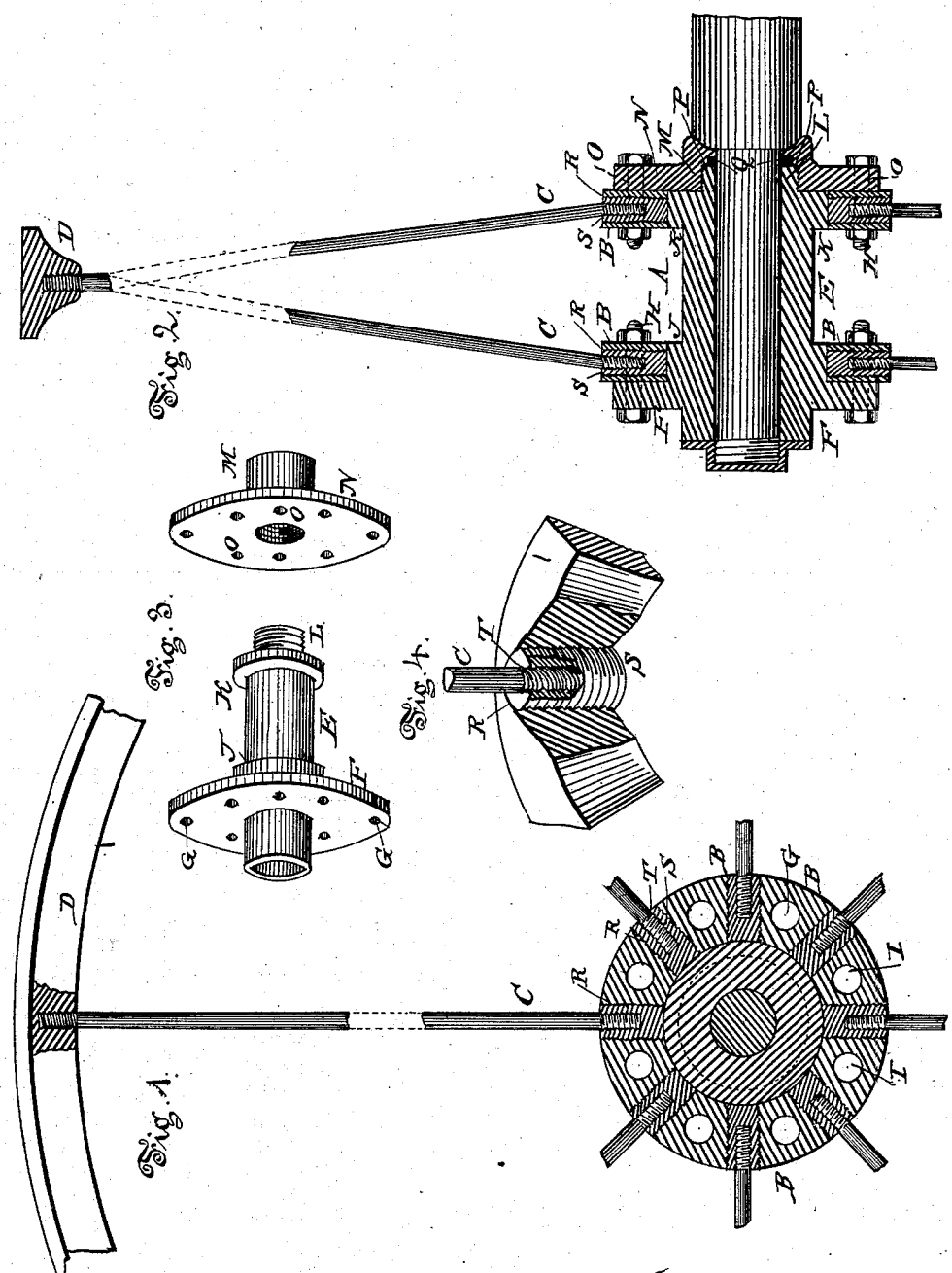

FRANCIS M. GIDEON, OF WASHINGTON, DISTRICT OF COLUMBIA.

VEHICLE-WHEEL.

SPECIFICATION forming part of Letters Patent No. 278,534, dated May 29, 1883.

Application filed March 16, 1883. (No model.)

*To all whom it may concern:*

Be it known that I, FRANCIS M. GIDEON, of Washington, in the District of Columbia, have invented certain new and useful Improvements in Vehicle-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of part of my improved vehicle-wheel. Fig. 2 is a vertical diametrical section of the same. Fig. 3 is a perspective detail view of the two parts forming the hub separated, and Fig. 4 is a detail view of the fastening for securing the spokes to the hub.

Similar letters of reference indicate corresponding parts in all the figures.

My invention has relation to vehicle-wheels, and more particularly to that class of metallic wheels in which the spokes extend obliquely from both ends of the hub toward the fellies; and it consists in the improved construction and combination of parts of the same, as hereinafter more fully described and claimed.

In the accompanying drawings, the letter A indicates the hub; B B, two annular disks secured upon the hub; C, the spokes secured in said disks, and D the rim or fellies.

The hub is composed of a sleeve, E, having a wide flange, F, provided with bolt-holes G, through which bolts H, passing through corresponding bolt-holes in one of the disks B, are passed, securing the said disks upon the flange. Immediately inside this flange is an annular shoulder or offset, J, upon which the disk fits, and a similar offset, K, is near the other end of the sleeve, the portion L of which, outside this offset, is reduced and screw-threaded, fitting into the female threaded inner end of a short sleeve, M, having a flange, N, provided with bolt-holes O, for the reception of bolts securing the other disk B to it, said disk fitting upon shoulder K. Inside the female threaded portion of the bore in sleeve M is an annular shoulder, P, against which the end of sleeve E bears, while the bore of sleeve M is larger in diameter than the axle for a short space, forming an annular oil-receptacle, Q, around the axle.

The disks B have radial screw-threaded perforations R, corresponding in number to the number of spokes, at intervals between the bolt-holes I, and screw-threaded sleeves or thimbles S, having axial screw-threaded bores T, opening at their outer ends, and into which the inner screw-threaded ends of the spokes fit. The outer screw-threaded ends of the spokes fit into screw-threaded sockets in the fellies or rim of the wheel, and the threads upon the inner ends of the spokes have a steeper pitch than the threads upon the outside of the sleeves, running in the same direction as the latter and as the threads upon the outer ends.

In putting the wheel together the outer ends of the spokes are inserted a short distance into their sockets, whereupon the sleeves are inserted from the inside of the annular disks and screwed into their respective screw-threaded holes, at the same time becoming screwed up upon the inner ends of the spokes, and in turning the sleeves the spokes will likewise be turned with them, screwing them into their sockets in the rim at the same time, the sleeves tighten them, and if during use the spokes become loosened they may be tightened by turning the sleeves, which, while becoming raised only a short distance, will draw the spokes down tight. After the spokes are inserted the disks are placed upon their respective shoulders upon the sleeve of the hub, the smaller portion of the hub screwed upon the longer portion of the same, and the disks secured to the flanges upon the hub by their respective bolts, thus making the wheel complete.

Having thus described my invention, I claim and desire to secure by Letters Patent of the United States—

1. The hub consisting of the longer sleeve E, having reduced screw-threaded end L, and the shorter sleeve M, having central female threaded bore, forming shoulders P, and smooth reduced oil-receptacle Q, as and for the purpose shown and set forth.

2. The combination of the hub A, formed in two parts screwed together, having annular flanges F and N, provided with bolt-holes G and O, and shoulders J and K, the annular disks B B, in which the inner ends of the spokes are secured, and having bolt-holes G, and fastening-bolts H, as and for the purpose shown and set forth.

3. The vehicle-wheel consisting of the rim D, having screw-threaded sockets, the spokes C, having screw-threaded ends, the disks B, having radial screw-threaded perforations R, and bolt-holes I, screw-threaded sleeves or thimbles S, having axial screw-threaded sockets T, sleeve E, screw-threaded at its reduced end, and having flange F, provided with bolt-holes G, and shoulders J and K, and sleeve M, having flange N, provided with bolt-holes O, and shoulder P at the inner end of its screw-threaded bore, all constructed, combined, and arranged as and for the purpose shown and set forth.

In testimony that I claim the foregoing as my own I have hereunto affixed my signature in presence of two witnesses.

FRANCIS M. GIDEON.

Witnesses:
WM. SECHER,
ARTHUR L. MORSELL.